United States Patent
Ito et al.

(10) Patent No.: US 11,916,502 B2
(45) Date of Patent: Feb. 27, 2024

(54) ELECTRIC POWER CONVERSION APPARATUS

(71) Applicant: DENSO CORPORATION, Kariya (JP)

(72) Inventors: Mitsutaka Ito, Nisshin (JP); Atsushi Fukaya, Kariya (JP); Hisashi Umemoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 244 days.

(21) Appl. No.: 17/565,140

(22) Filed: Dec. 29, 2021

(65) Prior Publication Data

US 2022/0123686 A1 Apr. 21, 2022

Related U.S. Application Data

(63) Continuation of application No. PCT/JP2020/026105, filed on Jul. 2, 2020.

(30) Foreign Application Priority Data

Jul. 4, 2019 (JP) .................................. 2019-125472

(51) Int. Cl.
*H01M 16/00* (2006.01)
*H02P 27/08* (2006.01)
(Continued)

(52) U.S. Cl.
CPC ........ *H02P 27/08* (2013.01); *H01M 10/0525* (2013.01); *H01M 10/425* (2013.01);
(Continued)

(58) Field of Classification Search
CPC .......... H02P 27/08; H02P 29/60; H02P 29/62; H01M 10/0525; H01M 10/425;
(Continued)

(56) References Cited

U.S. PATENT DOCUMENTS

2014/0307495 A1* 10/2014 Fukuta ................ H02M 7/5387
361/87
2016/0226386 A1* 8/2016 Fukuta .................... B60L 50/60
(Continued)

FOREIGN PATENT DOCUMENTS

JP 5865736 B2 2/2016

*Primary Examiner* — Muhammad S Islam
(74) *Attorney, Agent, or Firm* — Oliff PLC

(57) ABSTRACT

An electric power conversion apparatus includes a rotating electric machine including armature windings, a first inverter connecting the armature windings with a first storage battery, a second inverter connecting the armature windings with a second storage battery, a changeover switch configured to connect or disconnect between first and second positive buses or between first and second negative buses, and an operating unit configured to perform, with the changeover switch being in an ON state, first and second energization processes alternately. In the first energization process, electric current is supplied from the first storage battery to the second storage battery via the first inverter, at least one of the armature windings and the second inverter. In the second energization process, electric current is supplied from the second storage battery to the first storage battery via the second inverter, at least one of the armature windings and the first inverter.

6 Claims, 12 Drawing Sheets

(51) Int. Cl.
  *H02P 29/60* (2016.01)
  *H01M 50/507* (2021.01)
  *H01M 10/0525* (2010.01)
  *H01M 10/42* (2006.01)
  *H01M 10/46* (2006.01)
  *H01M 10/48* (2006.01)

(52) U.S. Cl.
  CPC ......... *H01M 10/46* (2013.01); *H01M 10/486* (2013.01); *H01M 50/507* (2021.01); *H02P 29/60* (2016.02); *H01M 2220/20* (2013.01)

(58) Field of Classification Search
  CPC .. H01M 10/46; H01M 10/486; H01M 50/507; H01M 2220/20
  See application file for complete search history.

(56) References Cited

U.S. PATENT DOCUMENTS

| | | | | |
|---|---|---|---|---|
| 2017/0313170 | A1* | 11/2017 | Hara | B60L 50/66 |
| 2018/0069425 | A1* | 3/2018 | Mastrandrea | H01M 10/486 |
| 2018/0102649 | A1* | 4/2018 | Dewa | H02M 7/219 |
| 2019/0241214 | A1* | 8/2019 | Oka | B62D 6/10 |

* cited by examiner

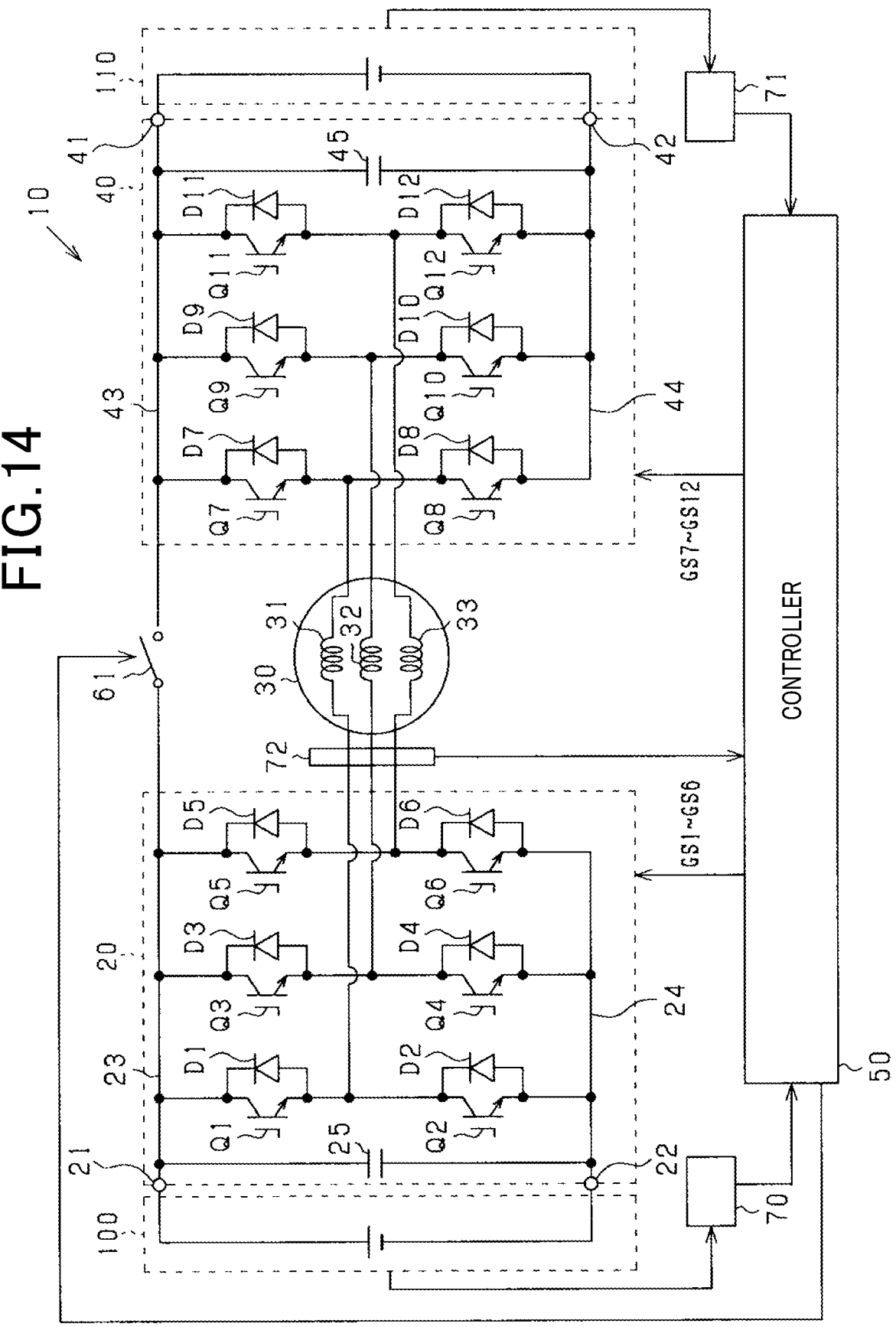

ELECTRIC POWER CONVERSION APPARATUS

CROSS-REFERENCE TO RELATED APPLICATIONS

The present application is a continuation application of International Application No. PCT/JP2020/026105 filed on Jul. 2, 2020, which is based on and claims priority from Japanese Patent Application No. 2019-125472 filed on Jul. 4, 2019. The entire contents of these applications are incorporated by reference into the present application.

BACKGROUND

1. Technical Field

The present disclosure relates to electric power conversion apparatuses that convert electric power from storage batteries.

2. Description of Related Art

There is known an electric power conversion apparatus that includes a storage battery, a capacitor, and an inverter connected between the storage battery and the capacitor. The electric power conversion apparatus is configured to raise the temperature of the storage battery by causing charge/discharge current to flow through the storage battery. Specifically, in the known electric power conversion apparatus, the flow of electric current is switched between first and second modes through operation of switches of the inverter. In the first mode, electric current flows from the storage battery to the capacitor. In contrast, in the second mode, electric current flows from the capacitor to the storage battery. Consequently, charge/discharge current flows through the storage battery, thereby making it possible to suppress excessive decrease in the discharge capacity and/or the operating voltage of the storage battery even at extremely low temperatures.

SUMMARY

According to the present disclosure, there is provided an electric power conversion apparatus which includes: a rotating electric machine including a plurality of armature windings each having a first end and a second end; a first inverter including a plurality of switch pairs each consisting of a first upper-arm switch and a first lower-arm switch that are connected in series with each other, the first inverter connecting the first ends of the armature windings with a first storage battery; a second inverter including a plurality of switch pairs each consisting of a second upper-arm switch and a second lower-arm switch that are connected in series with each other, the second inverter connecting the second ends of the armature windings with a second storage battery; a first positive bus connected with a positive terminal of the first storage battery; a second positive bus connected with a positive terminal of the second storage battery; a first negative bus connected with a negative terminal of the first storage battery; a second negative bus connected with a negative terminal of the second storage battery; a changeover switch configured to electrically connect or disconnect between the first positive bus and the second positive bus or between the first negative bus and the second negative bus; and an operating unit configured to operate (more specifically, turn on/off) the changeover switch, the first upper-arm and first lower-arm switches of the first inverter and the second upper-arm and second lower-arm switches of the second inverter. Moreover, in the electric power conversion apparatus, each of the armature windings has the first end thereof connected to a junction point between the first upper-arm and first lower-arm switches of a corresponding one of the switch pairs of the first inverter and the second end thereof connected to a junction point between the second upper-arm and second lower-arm switches of a corresponding one of the switch pairs of the second inverter. The operating unit is further configured to perform, with the changeover switch being in an ON state, a first energization process and a second energization process alternately by operating the first upper-arm and first lower-arm switches of the first inverter and the second upper-arm and second lower-arm switches of the second inverter. In the first energization process, electric current is supplied from the first storage battery to the second storage battery via the first inverter, at least one of the armature windings and the second inverter. In the second energization process, electric current is supplied from the second storage battery to the first storage battery via the second inverter, at least one of the armature windings and the first inverter.

BRIEF DESCRIPTION OF THE DRAWINGS

FIG. 14 is an overall configuration diagram of an electric power conversion apparatus according to a fifth embodiment.

DESCRIPTION OF EMBODIMENTS

Figure 1:
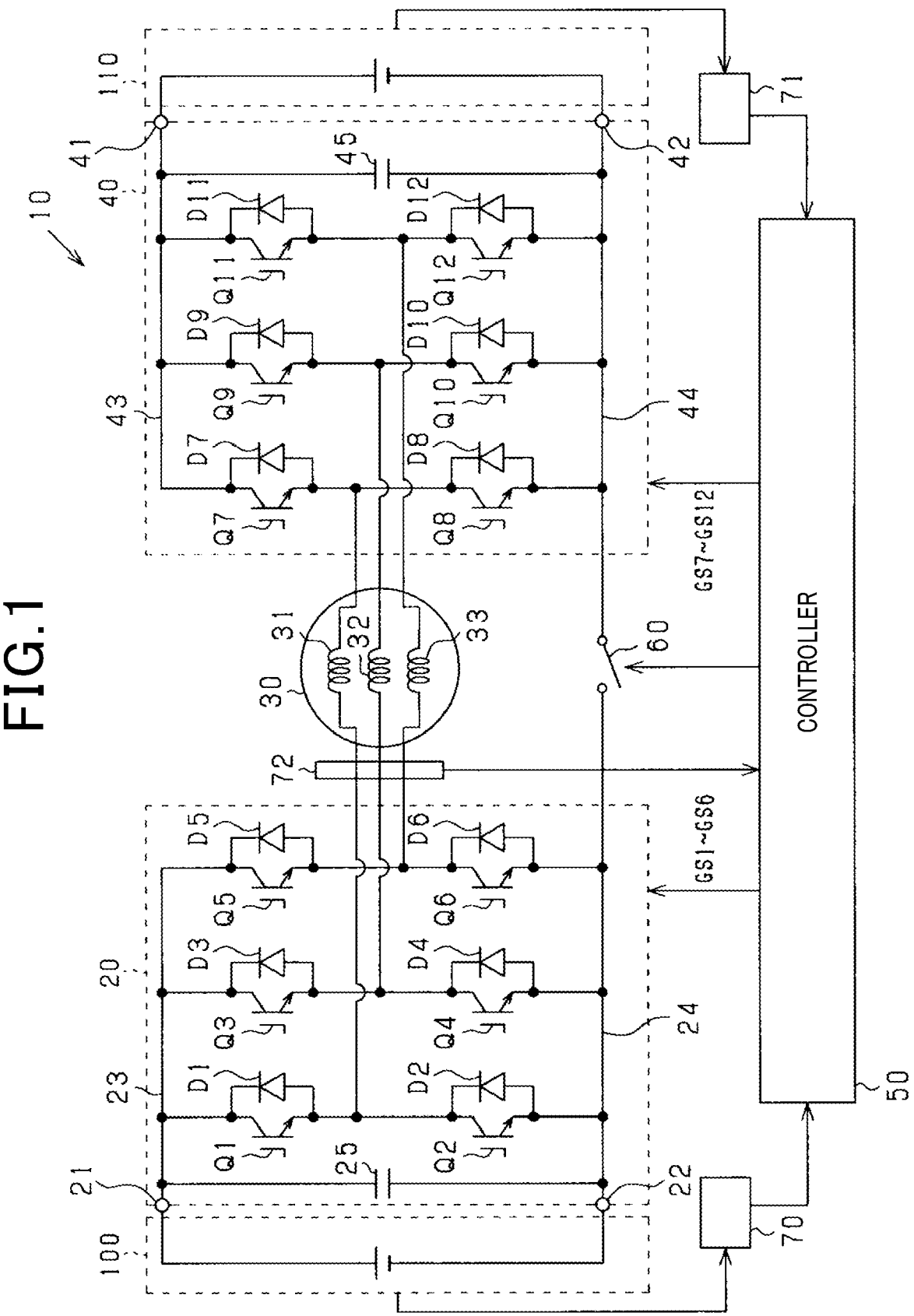
FIG. 1 is an overall configuration diagram of an electric power conversion apparatus according to a first embodiment.

The impedance of a capacitor has a frequency characteristic such that it has a negative correlation with the frequency of electric current. Therefore, in the known electric power conversion apparatus (see, for example, Japanese Patent No. JP 5865736 B2) described above, if the switching period of the flow direction of electric current between the storage battery and the capacitor is long during the raising of the temperature of the storage battery, the impedance of the capacitor will become high and thus it may become impossible to have electric current sufficient to raise the temperature of the storage battery flow through the storage battery. On the other hand, the impedance of a reactor has a frequency characteristic such that it has a positive correlation with the frequency of electric current. Therefore, in the case of the electric power conversion apparatus including a reactor, if the switching period of the flow direction of electric current between the storage battery and the capacitor is short during the raising of the temperature of the storage battery, the impedance of the reactor will become high and thus it may become impossible to have electric current sufficient to raise the temperature of the storage battery flow through the storage battery.

The present disclosure has been accomplished in view of the above problem with the known electric power conversion apparatus.

In the above-described electric power conversion apparatus according to the present disclosure, the first positive bus and the second positive bus, or the first negative bus and the second negative bus are electrically connected to or disconnected from each other by the changeover switch. In raising the temperatures of the first and second storage batteries, the operating unit first turns on the changeover switch. Then, the operating unit performs the first and second energization processes alternately by turning on/off the first upper-arm and first lower-arm switches of the first inverter and the second upper-arm and second lower-arm switches of the second inverter. In the first energization process, electric current is supplied from the first storage battery to the second storage battery via the first inverter, at least one of the armature windings and the second inverter. In the second energization process, electric current is supplied from the second storage battery to the first storage battery via the second inverter, at least one of the armature windings and the first inverter. Compared to capacitors, storage batteries are less constrained by the frequency characteristics of the impedances thereof. Therefore, configuring the first and second storage batteries to mutually supply electric energy to each other, it becomes possible to have electric current sufficient to raise the temperatures of the first and second storage batteries flow through the first and second storage batteries.

Exemplary embodiments will be described hereinafter with reference to the drawings. It should be noted that for the sake of clarity and understanding, identical components having identical functions throughout the whole description have been marked, where possible, with the same reference numerals in the drawings and that for the sake of avoiding redundancy, explanation of identical components will not be repeated.

First Embodiment

FIG. 1 illustrates the overall configuration of an electric power conversion apparatus 10 according to the first embodiment. The electric power conversion apparatus 10 is designed to be used in, for example, a vehicle.

As shown in FIG. 1, the electric power conversion apparatus 10 is connected between a first storage battery 100 and a second storage battery 110. Each of the first and second storage batteries 100 and 110 is an assembled battery which is composed of a plurality of unit batteries connected in series with each other. Each of the unit batteries may be, for example, a lithium-ion storage battery. The electric power conversion apparatus 10 includes a first inverter 20, a rotating electric machine 30 and a second inverter 40.

The first inverter 20 has a first terminal 21 connected with a positive terminal of the first storage battery 100 and a second terminal 22 connected with a negative terminal of the first storage battery 100. Moreover, a first positive bus 23 is connected with the first terminal 21 of the first inverter 20 whereas a first negative bus 24 is connected with the second terminal 22 of the first inverter 20. Furthermore, the first positive bus 23 and the first negative bus 24 are connected with each other by a serially-connected switch pair consisting of a first switch Q1 and a second switch Q2, a serially-connected switch pair consisting of a third switch Q3 and a fourth switch Q4 and a serially-connected switch pair consisting of a fifth switch Q5 and a sixth switch Q6. Here, the first, third and fifth switches Q1, Q3 and Q5 constitute first upper-arm switches of the electric power conversion apparatus 10 while the second, fourth and sixth switches Q2, Q4 and Q6 constitute first lower-arm switches of the electric power conversion apparatus 10. In the present embodiment, each of the first to the sixth switches Q1-Q6 is implemented by an IGBT (Insulated Gate Bipolar Transistor).

Specifically, the first, third and fifth switches Q1, Q3 and Q5 have the collectors thereof each connected with the first positive bus 23 and the emitters thereof respectively connected with the collectors of the second, fourth and sixth switches Q2, Q4 and Q6. Moreover, the emitters of the second, fourth and sixth switches Q2, Q4 and Q6 are each connected with the first negative bus 24. In addition, the first to the sixth switches Q1-Q6 respectively have first to sixth diodes D1-D6 connected in antiparallel thereto.

In the first inverter 20, there is provided a capacitor 25 that is connected between the first positive bus 23 and the first negative bus 24. It should be noted that the capacitor 25 may alternatively be provided outside the first inverter 20.

The second inverter 40 has a third terminal 41 connected with a positive terminal of the second storage battery 110 and a fourth terminal 42 connected with a negative terminal of the second storage battery 110. Moreover, a second positive bus 43 is connected with the third terminal 41 of the second inverter 40 whereas a second negative bus 44 is connected with the fourth terminal 42 of the second inverter 40. Furthermore, the second positive bus 43 and the second negative bus 44 are connected with each other by a serially-connected switch pair consisting of a seventh switch Q7 and an eighth switch Q8, a serially-connected switch pair consisting of a ninth switch Q9 and a tenth switch Q10 and a serially-connected switch pair consisting of an eleventh switch Q11 and a twelfth switch Q12. Here, the seventh, ninth and eleventh switches Q7, Q9 and Q11 constitute second upper-arm switches of the electric power conversion apparatus 10 while the eighth, tenth and twelfth switches Q8, Q10 and Q12 constitute second lower-arm switches of the electric power conversion apparatus 10. In the present embodiment, each of the seventh to the twelfth switches Q7-Q12 is implemented by an IGBT.

Specifically, the seventh, ninth and eleventh switches Q7, Q9 and Q11 have the collectors thereof each connected with the second positive bus 43 and the emitters thereof respectively connected with the collectors of the eighth, tenth and twelfth switches Q8, Q10 and Q12. Moreover, the emitters of the eighth, tenth and twelfth switches Q8, Q10 and Q12 are each connected with the second negative bus 44. In addition, the seventh to the twelfth switches Q7-Q12 respectively have seventh to twelfth diodes D7-D12 connected in antiparallel thereto.

In the second inverter 40, there is provided a capacitor 45 that is connected between the second positive bus 43 and the second negative bus 44. It should be noted that the capacitor 45 may alternatively be provided outside the second inverter 40.

The rotating electric machine 30 is a three-phase rotating electric machine which is designed to be used as a propulsion machine in a vehicle. The rotating electric machine 30 has a rotor configured so that mechanical power can be transmitted between the rotor and driving wheels of the vehicle. In the present embodiment, the rotating electric machine 30 has three armature windings respectively for three phases, i.e., a U-phase winding 31, a V-phase winding 32 and a W-phase winding 33.

The U-phase winding 31 has a first end connected to a junction point between the first switch Q1 and the second switch Q2 in the first inverter 20 and a second end connected to a junction point between the seventh switch Q7 and the eighth switch Q8 in the second inverter 40. The V-phase winding 32 has a first end connected to a junction point between the third switch Q3 and the fourth switch Q4 in the first inverter 20 and a second end connected to a junction point between the ninth switch Q9 and the tenth switch Q10 in the second inverter 40. The W-phase winding 33 has a first end connected to a junction point between the fifth switch Q5 and the sixth switch Q6 in the first inverter 20 and a second end connected to a junction point between the eleventh switch Q11 and the twelfth switch Q12 in the second inverter 40.

The electric power conversion apparatus 10 includes a controller 50. The controller 50 is configured to output gate signals GS1-GS6 for turning on/off the first to the sixth switches Q1-Q6 of the first inverter 20 and gate signals GS7-GS12 for turning on/off the seventh to the twelfth switches Q7-Q12 of the second inverter 40. In addition, various functions of the controller 50 may be realized by software stored in a tangible memory device and a computer that executes the software, by hardware, or by a combination of the aforementioned means.

The electric power conversion apparatus 10 also includes a first monitor 70 configured to monitor the state of the first storage battery 100 and a second monitor 71 configured to monitor the state of the second storage battery 110. The first monitor 70 calculates a first SOC1 indicating the residual capacity of the first storage battery 100, whereas the second monitor 71 calculates a second SOC2 indicating the residual capacity of the second storage battery 110. Here, SOC (State Of Charge) represents the ratio of the residual capacity of a storage battery to the capacity of the storage battery when it is fully charged, and takes a value between 0% and 100%. Moreover, the first monitor 70 detects a first battery temperature Tb1 which is the temperature of the first storage battery 100, whereas the second monitor 71 detects a second battery temperature Tb2 which is the temperature of the second storage battery 110. In addition, in the present embodiment, the first and second monitors 70 and 71 together correspond to both a residual capacity calculator and a temperature detector.

The electric power conversion apparatus 10 further includes a current sensor 72 that detects a winding current IMr. The winding current IMr represents the actual values of electric currents flowing through the U-phase, V-phase and W-phase windings 31, 32 and 33 of the rotating electric machine 30.

The first negative bus 24 of the first inverter 20 and the second negative bus 44 of the second inverter 40 are connected by a changeover switch 60. In the present embodiment, the changeover switch 60 is implemented by a normally-open relay. The first negative bus 24 and the second negative bus 44 are electrically connected with each other upon the changeover switch 60 being turned on and electrically disconnected from each other upon the changeover switch 60 being turned off.

In the present embodiment, when a determination target temperature Tb3, which is the lower one of the first battery temperature Tb1 and the second battery temperature Tb2, is lower than a low-temperature determination value TL, the controller 50 performs a temperature-raising control to raise the temperatures of the first and second storage batteries 100 and 110. In the temperature-raising control, a first energization process (or first electric current supply process) and a second energization process (or second electric current supply process) are alternately performed. In the first energization process, discharge current from the first storage battery 100 is supplied to the second storage battery 110. In contrast, in the second energization process, discharge current from the second storage battery 110 is supplied to the first storage battery 100. In addition, in the present embodiment, the controller 50 serves as an operating unit to operate (more specifically, turn on/off) the changeover switch 60, the first to the sixth switches Q1-Q6 of the first inverter 20 and the seventh to the twelfth switches Q7-Q12 of the second inverter 40.

Next, the temperature-raising control performed by the controller 50 according to the present embodiment will be described.

Figure 2:
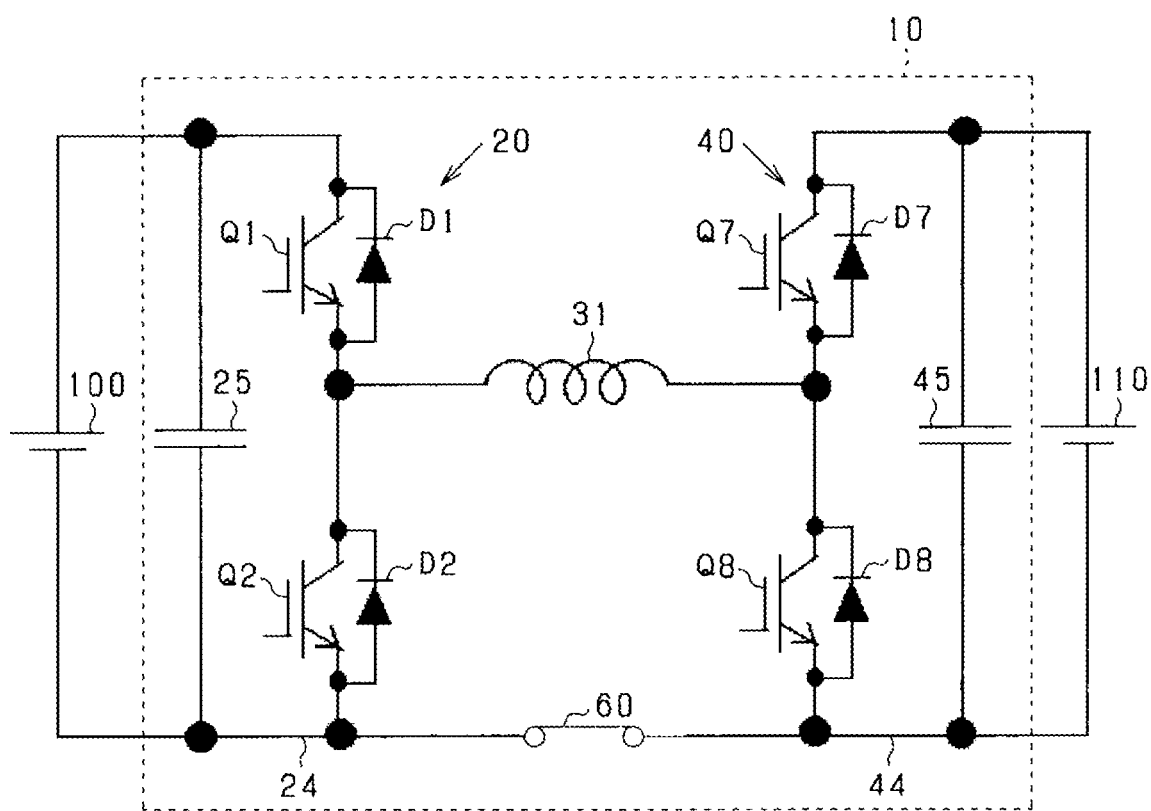
FIG. 2 is a schematic circuit diagram illustrating an equivalent circuit of part of the electric power conversion apparatus corresponding to a U phase.

FIG. 2 illustrates an equivalent circuit of part of the electric power conversion apparatus 10 corresponding to the U phase. In FIG. 2, the junction point between the first switch Q1 and the second switch Q2 and the junction point between the seventh switch Q7 and the eighth switch Q8 are connected by the U-phase winding 31, thereby forming an H-bridge circuit.

In the temperature-raising control, first, the controller 50 sets the relay operation signal to an ON command. The relay operation signal is a signal for switching the changeover switch 60 between an ON state and an OFF state. Upon the changeover switch 60 being turned on, the first negative bus 24 of the first inverter 20 and the second negative bus 44 of the second inverter 40 are brought into a connected state. Then, in order to transfer electric energy from the first storage battery 100 to the second storage battery 110, the controller 50 performs the first energization process by turning on/off the switches of the first and second inverters 20 and 40. More specifically, the controller 50 controls electric current flowing from the first storage battery 100 to the second storage battery 110 via the U-phase winding 31 by adjusting the duty ratios of the first and second switches Q1 and Q2 of the first inverter 20 and the duty ratios of the seventh and eighth switches Q7 and Q8 of the second inverter 40.

Moreover, in order to transfer electric energy from the second storage battery 110 to the first storage battery 100, the controller 50 performs the second energization process by turning on/off the switches of the first and second inverters 20 and 40. More specifically, the controller 50 controls electric current flowing from the second storage battery 110 to the first storage battery 100 via the U-phase winding 31 by adjusting the duty ratios of the first and second switches Q1 and Q2 of the first inverter 20 and the duty ratios of the seventh and eighth switches Q7 and Q8 of the second inverter 40.

With the first and second energization processes being alternately performed, charge/discharge current flows through the first and second storage batteries 100 and 110, thereby raising the temperatures of the first and second storage batteries 100 and 110. At this time, since electric energy is reciprocally transferred between the first storage battery 100 and the second storage battery 110, the consumption of electric energy is suppressed.

Figure 3:
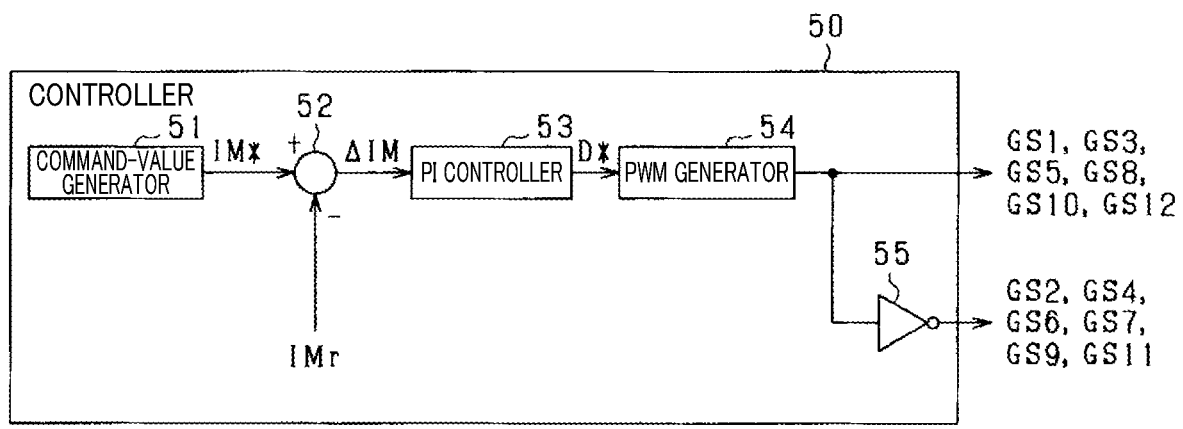
FIG. 3 is a functional block diagram of a controller of the electric power conversion apparatus.

FIG. 3 is a functional block diagram of the controller 50 according to the present embodiment. As shown in FIG. 3, the controller 50 includes a command-value generator 51, a current deviation calculator 52, a PI controller 53, a PWM generator 54 and a phase inverter 55.

Figure 4:
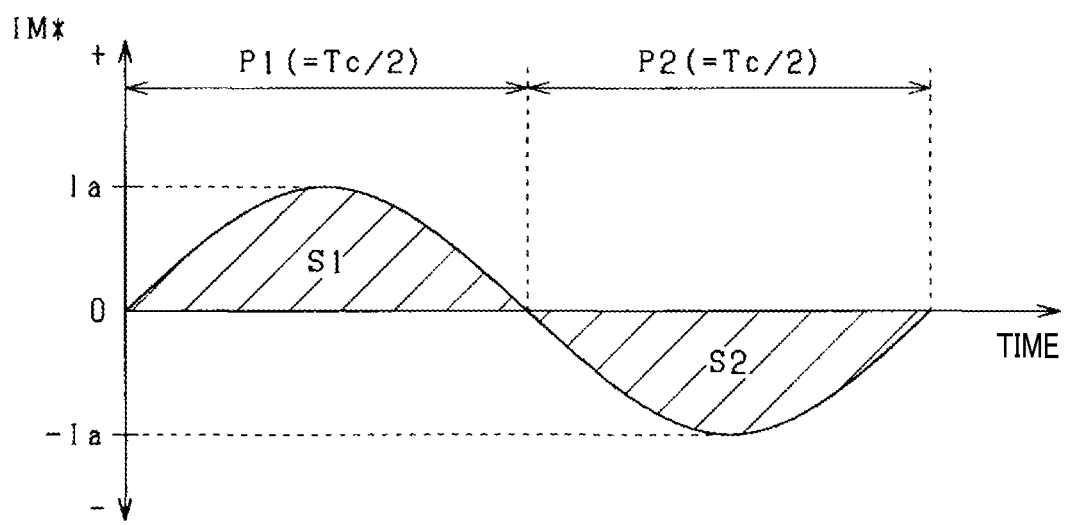
FIG. 4 is a waveform chart illustrating the waveform of a command current generated by a command-value generator of the controller.

The command-value generator 51 generates a command current IM* which is a command value for electric currents flowing through the U-phase, V-phase and W-phase windings 31, 32 and 33 during the temperature-raising control. In the present embodiment, as shown in FIG. 4, the command-value generator 51 generates the command current IM* that changes in the form of a sine wave during one period Tc of the temperature-raising control. Specifically, the command-value generator 51 generates the command current IM* so that it is in the form of a positive half wave in a first period P1 during which the first energization process is performed and in the form of a negative half wave in a second period P2 during which the second energization process is performed. In the present embodiment, for each of the U-phase, V-phase and W-phase windings 31, 32 and 33, the direction of electric current flowing through the phase winding is defined to be positive when the electric current flows from the first end to the second end of the phase winding and to be negative when the electric current flows from the second end to the first end of the phase winding; the first end of the phase winding is connected to the first inverter 20 whereas the second end of the phase winding is connected to the second inverter 40.

In the present embodiment, the command-value generator 51 generates the command current IM* so that in one period Tc of the command current IM*, the positive command current IM* and the negative command current IM* are point-symmetrical with respect to a zero-crossing timing of the command current IM*. Consequently, the first period P1 from a first zero-upcrossing timing to a zero-downcrossing timing of the command current IM* and the second period P2 from the zero-downcrossing timing to a second zero-upcrossing timing of the command current IM* have the same length (i.e., Tc/2). Moreover, in one period Tc of the command current IM*, the area S1 of a first region and the area S2 of a second region are equal to each other. The first region S1 is a region enclosed by the time axis from the first zero-upcrossing timing to the zero-downcrossing timing of the command current IM* and the positive command current IM* in the one period Tc. On the other hand, the second region S2 is a region enclosed by the time axis from the zero-downcrossing timing to the second zero-upcrossing timing of the command current IM* and the negative command current IM* in the one period Tc. Setting (S1=S2), the charge/discharge current of the first storage battery 100 and the charge/discharge current of the second storage battery 110 in one period Tc of the command current IM* can be balanced with each other, thereby making it possible to suppress increase in the difference between the terminal voltage of the first storage battery 100 and the terminal voltage of the second storage battery 110 during the temperature-raising control.

Referring back to FIG. 3, the command current IM* generated by the command-value generator 51 is inputted to the current deviation calculator 52. Then, the current deviation calculator 52 calculates a current deviation ΔIM by subtracting the winding current IMr, which represents the actual values of electric currents flowing through the U-phase, V-phase and W-phase windings 31, 32 and 33, from the command current IM*.

The current deviation ΔIM calculated by the current deviation calculator 52 is inputted to the PI controller 53. Then, the PI controller 53 calculates a duty command value D* as a manipulated variable for feedback-controlling the current deviation ΔIM to 0. The duty command value D* is a command value for the percentage (i.e., Ton/Tsw) of an ON command Ton in one switching period Tsw of the first, third, fifth, eighth, tenth and twelfth switches Q1, Q3, Q5, Q8, Q10 and Q12.

The duty command value D* calculated by the PI controller 53 is inputted to the PWM generator 54. Then, the PWM generator 54 generates a first operation signal based on the duty command value D*, and outputs the generated first operation signal to the gates of the first, third, fifth, eighth, tenth and twelfth switches Q1, Q3, Q5, Q8, Q10 and Q12. In the present embodiment, the first operation signal in a high state represents an ON command for the switches whereas the first operation signal in a low state represents an OFF command for the switches.

The first operation signal outputted from the PWM generator 54 to the gate of the first switch Q1 constitutes a first gate signal GS1. The first operation signal outputted from the PWM generator 54 to the gate of the third switch Q3 constitutes a third gate signal GS3. The first operation signal outputted from the PWM generator 54 to the gate of the fifth switch Q5 constitutes a fifth gate signal GS5. The first operation signal outputted from the PWM generator 54 to the gate of the eighth switch Q8 constitutes an eighth gate signal GS8. The first operation signal outputted from the PWM generator 54 to the gate of the tenth switch Q10 constitutes a tenth gate signal GS10. The first operation signal outputted from the PWM generator 54 to the gate of the twelfth switch Q12 constitutes a twelfth gate signal GS12. In the present embodiment, the first, third, fifth, eighth, tenth and twelfth gate signals GS1, GS3, GS5, GS8, GS10 and GS12 are synchronized with each other.

The first operation signal generated by the PWM generator 54 is also inputted to the phase inverter 55. Then, the phase inverter 55 generates a second operation signal by inverting the logic of the first operation signal, and outputs the generated second operation signal to the gates of the second, fourth, sixth, seventh, ninth and eleventh switches Q2, Q4, Q6, Q7, Q9 and Q11. In the present embodiment, the second operation signal in a high state represents an ON command for the switches whereas the second operation signal in a low state represents an OFF command for the switches.

The second operation signal outputted from the phase inverter 55 to the gate of the second switch Q2 constitutes a second gate signal GS2. The second operation signal outputted from the phase inverter 55 to the gate of the fourth switch Q4 constitutes a fourth gate signal GS4. The second operation signal outputted from the phase inverter 55 to the gate of the sixth switch Q6 constitutes a sixth gate signal GS6. The second operation signal outputted from the phase inverter 55 to the gate of the seventh switch Q7 constitutes a seventh gate signal GS7. The second operation signal outputted from the phase inverter 55 to the gate of the ninth switch Q9 constitutes a ninth gate signal GS9. The second operation signal outputted from the phase inverter 55 to the gate of the eleventh switch Q11 constitutes an eleventh gate signal GS11. In the present embodiment, the second, fourth, sixth, seventh, ninth and eleventh gate signals GS2, GS4, GS6, GS7, GS9 and GS11 are synchronized with each other.

Figure 5:
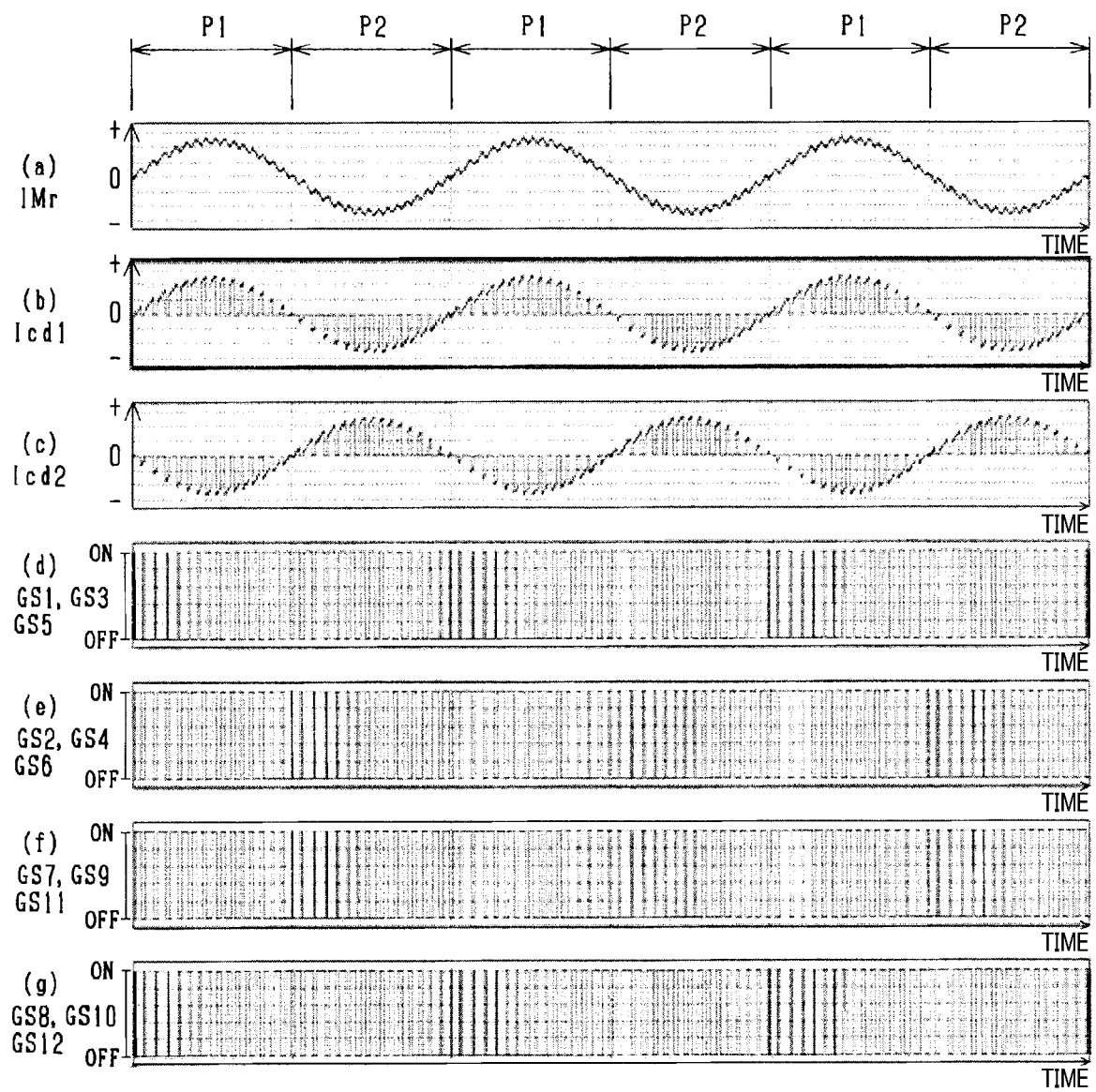
FIG. 5 is a timing chart illustrating operation of the electric power conversion apparatus.

FIG. 5 is a timing chart illustrating operation of the electric power conversion apparatus 10 according to the present embodiment. Specifically, FIG. 5(a) illustrates the change with time of the winding current IMr. FIG. 5(b) illustrates the change with time of electric current Icd1 flowing through the first storage battery 100. FIG. 5(c) illustrates the change with time of electric current Icd2 flowing through the second storage battery 110. FIG. 5(d) illustrates the first, third and fifth gate signals GS1, GS3 and GS5. FIG. 5(e) illustrates the second, fourth and sixth gate signals GS2, GS4 and GS6. FIG. 5(f) illustrates the seventh, ninth and eleventh gate signals GS7, GS9 and GS11. FIG. 5(g) illustrates the eighth, tenth and twelfth gate signals GS8, GS10 and GS12. In addition, in the explanation of FIG. 5 given below, the duty command value D* for the first, third and fifth gate signals GS1, GS3 and GS5 will be referred to as the first duty ratio Duty1; the duty command value D* for the seventh, ninth and eleventh gate signals GS7, GS9 and GS 11 will be referred to as the second duty ratio Duty2.

In each first period P1, the first duty ratio Duty1 of the first, third and fifth gate signals GS1, GS3 and GS5 is increased according to the command current IM*. On the other hand, the second duty ratio Duty2 of the seventh, ninth and eleventh gate signals GS7, GS9 and GS11 is decreased. Here, Duty2=1−Duty1. In addition, the duty ratios of the eighth, tenth and twelfth gate signals GS8, GS10 and GS12 are equal to the first duty ratio Duty1; the duty ratios of the second, fourth and sixth gate signals GS2, GS4 and GS6 are equal to the second duty ratio Duty2. Moreover, in each first period P1, the average value of the winding current IMr changes in the form of a positive half wave according to the combination of the first and second duty ratios Duty1 and Duty2. Consequently, the electric current Icd1 flowing through the first storage battery 100 becomes positive (i.e., discharge current) and the electric current Icd2 flowing through the second storage battery 110 becomes negative (i.e., charge current).

In each second period P2, the first duty ratio Duty1 of the first, third and fifth gate signals GS1, GS3 and GS5 turns from increase to decrease according to the command current IM*. On the other hand, the second duty ratio Duty2 of the seventh, ninth and eleventh gate signals GS7, GS9 and GS11 turns from decrease to increase. Moreover, in each second period P2, the average value of the winding current IMr changes in the form of a negative half wave according to the combination of the first and second duty ratios Duty1 and Duty2. Consequently, the electric current Icd2 flowing through the second storage battery 110 becomes positive (i.e., discharge current) and the electric current Icd1 flowing through the first storage battery 100 becomes negative (i.e., charge current).

Figure 6:
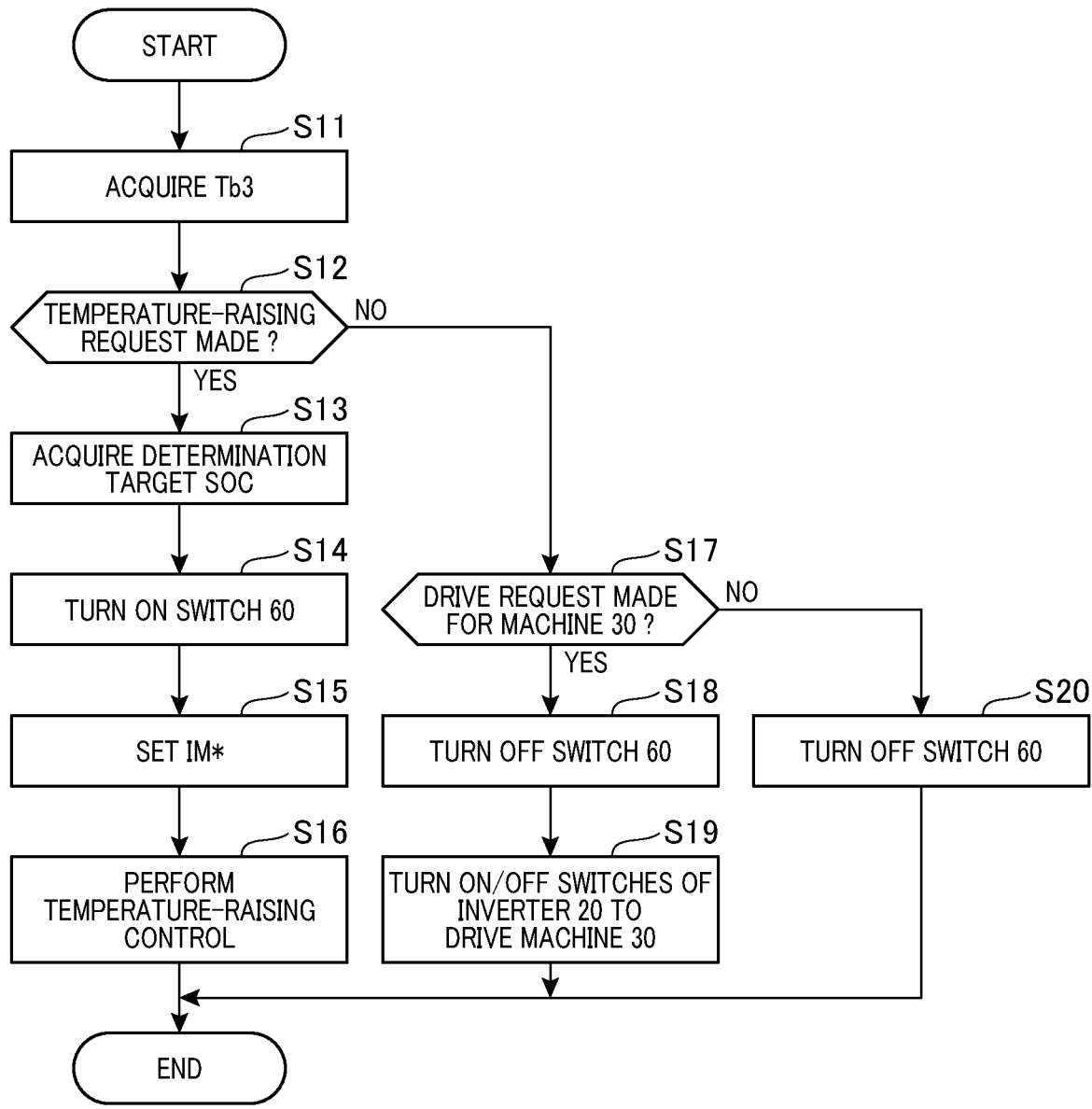
FIG. 6 is a flow chart illustrating a process of the controller for performing a temperature-raising control.

Next, a process of the controller 50 for performing the temperature-raising control will be described with reference to FIG. 6. This process is repeatedly executed by the controller 50 in a predetermined cycle.

First, in step S11, the determination target temperature Tb3, which is the lower one of the first battery temperature Tb1 and the second battery temperature Tb2, is acquired.

Then, in step S12, it is determined whether a temperature-raising request has been made to the first and second storage batteries 100 and 110. In the present embodiment, when the determination target temperature Tb3 acquired in step S11 is lower than the low-temperature determination value TL, it is determined that a temperature-raising request has been made.

If the determination in step S12 results in a "YES" answer, i.e., if a temperature-raising request has been made, the process proceeds to step S13.

In step S13, the lower one of the first SOC1 and the second SOC2 is acquired as a determination target SOC.

In step S14, the relay operation signal is set to the ON command and thus the changeover switch 60 is turned on. Consequently, the first negative bus 24 of the first inverter 20 and the second negative bus 44 of the second inverter 40 are connected with each other.

In step S15, the command current IM* is set based on both the determination target temperature Tb3 acquired in step S11 and the determination target SOC acquired in step S13.

Figure 7A:
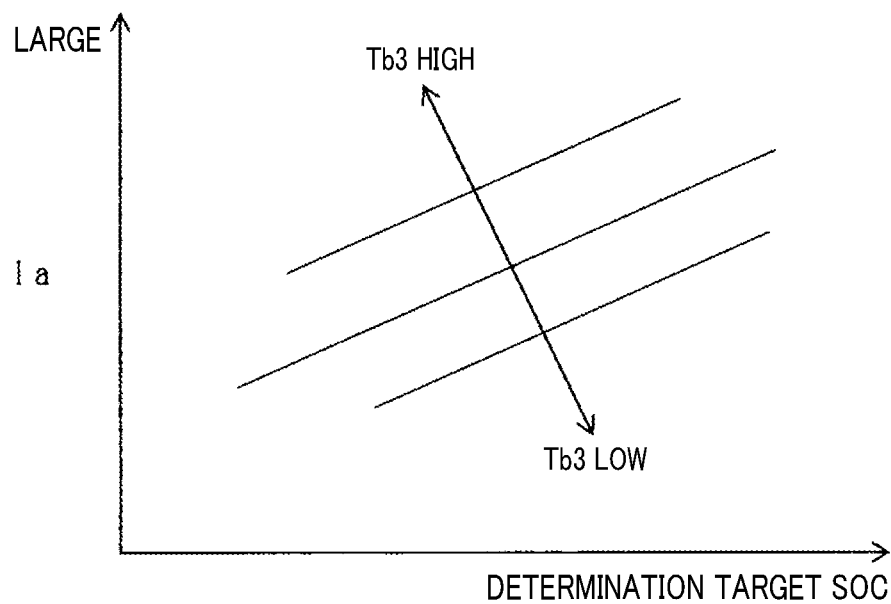
FIG. 7A is a graph illustrating the relationship between the amplitude of the command current, a determination target SOC and a determination target temperature.
Figure 7B:
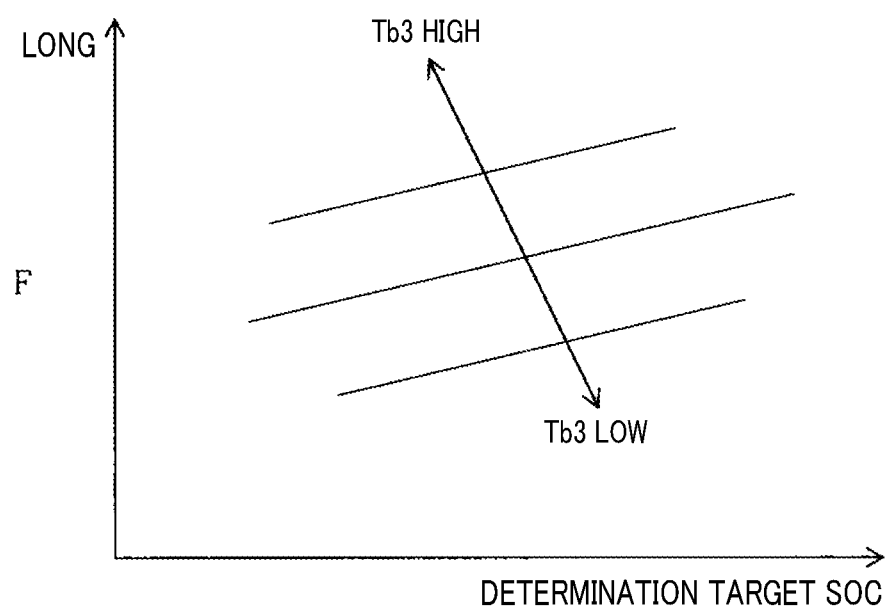
FIG. 7B is a graph illustrating the relationship between a switching period, the determination target SOC and the determination target temperature.

In the present embodiment, as shown in FIGS. 7A and 7B, the command current IM* is set so that the lower the determination target SOC, the smaller the current amplitude Ia becomes and the shorter the switching period F of the first energization process and the second energization process becomes. The purpose of setting the command current IM* as above is to suppress, by reducing the current amplitude Ia, decrease in the determination target SOC due to the temperature-raising control and to lower, by shortening the switching period F, the internal resistances of the first and second storage batteries 100 and 110 and thereby facilitate the flow of electric current through the first and second storage batteries 100 and 110.

Moreover, the lower the temperature of a storage battery, the lower the discharge capacity of the storage battery becomes. Therefore, in the present embodiment, the command current IM* is set so that the lower the determination target temperature Tb3, the smaller the current amplitude Ia becomes and the shorter the switching period F becomes.

In the present embodiment, the controller 50 has a command value map stored therein; the command value map associates the command current IM* with various combinations of the determination target SOC and the determination target temperature Tb3. Therefore, by referring to the command value map, the controller 50 can set the command current IM* according to both the determination target SOC and the determination target temperature Tb3.

Referring back to FIG. 6, in step S16, the temperature-raising control is performed using the command current IM* set in step S15. Thereafter, the process shown in FIG. 6 is terminated.

On the other hand, if the determination in step S12 results in a "NO" answer, i.e., if no temperature-raising request has been made, the process proceeds to step S17.

In step S17, it is determined whether a drive request has been made for driving the rotating electric machine 30. For example, when a start switch of the vehicle is turned on, it is determined that a drive request has been made for driving the rotating electric machine 30.

If the determination in step S17 results in a "YES" answer, i.e., if a drive request has been made, the process proceeds to step S18.

In step S18, the relay operation signal is set to an OFF command and thus the changeover switch 60 is turned off. Consequently, the first negative bus 24 of the first inverter 20 and the second negative bus 44 of the second inverter 40 are disconnected from each other.

In step S19, the first to the sixth switches Q1-Q6 of the first inverter 20 are turned on/off to drive the rotating electric machine 30. Thereafter, the process shown in FIG. 6 is terminated.

In contrast, if the determination in step S17 results in a "NO" answer, i.e., if no drive request has been made, the process proceeds to step S20.

In step S20, the relay operation signal is set to the OFF command and thus the changeover switch 60 is turned off. Consequently, the first negative bus 24 of the first inverter 20 and the second negative bus 44 of the second inverter 40 are disconnected from each other. Thereafter, the process shown in FIG. 6 is terminated.

According to the present embodiment, it is possible to achieve the following advantageous effects.

In the electric power conversion apparatus 10 according to the present embodiment, in performing the temperature-raising control for the first and second storage batteries 100 and 110, the controller 50 first turns on the changeover switch 60, thereby electrically connecting the first negative bus 24 and the second negative bus 44 with each other. Then, the controller 50 performs the first energization process and the second energization process alternately by turning on/off the upper-arm and lower-arm switches of the first and second inverters 20 and 40. In the first energization process, electric current is supplied from the first storage battery 100 to the second storage battery 110 via the first inverter 20, the armature windings 31-33 of the rotating electric machine 30 and the second inverter 40. In contrast, in the second energization process, electric current is supplied from the second storage battery 110 to the first storage battery 100 via the second inverter 40, the armature windings 31-33 of the rotating electric machine 30 and the first inverter 20. Consequently, the first storage battery 100 and the second storage battery 110 mutually supply electric energy to each other. As a result, it becomes possible to have electric current sufficient to raise the temperatures of the first and second storage batteries 100 and 110 flow through the first and second storage batteries 100 and 110.

Moreover, in the present embodiment, the controller 50 performs the first and second energization processes in such a manner that the lower the determination target SOC, the smaller the current amplitude Ia (i.e., the amplitude of electric current flowing through the first and second storage batteries 100 and 110) and the shorter the switching period F of the first and second energization processes. Consequently, when the SOCs of the first and second storage batteries 100 and 110 are low, it is still possible to raise the temperatures of the first and second storage batteries 100 and 110 while suppressing decrease in the SOCs.

Furthermore, in the present embodiment, the controller 50 performs the first and second energization processes in such a manner that the lower the determination target temperature Tb3, the smaller the current amplitude Ia and the shorter the switching period F. Consequently, when the discharge capacities of the first and second storage batteries 100 and 110 are low, it is still possible to raise the temperatures of the first and second storage batteries 100 and 110 while suppressing decrease in the SOCs of the first and second storage batteries 100 and 110.

Modification of First Embodiment

Figure 8:
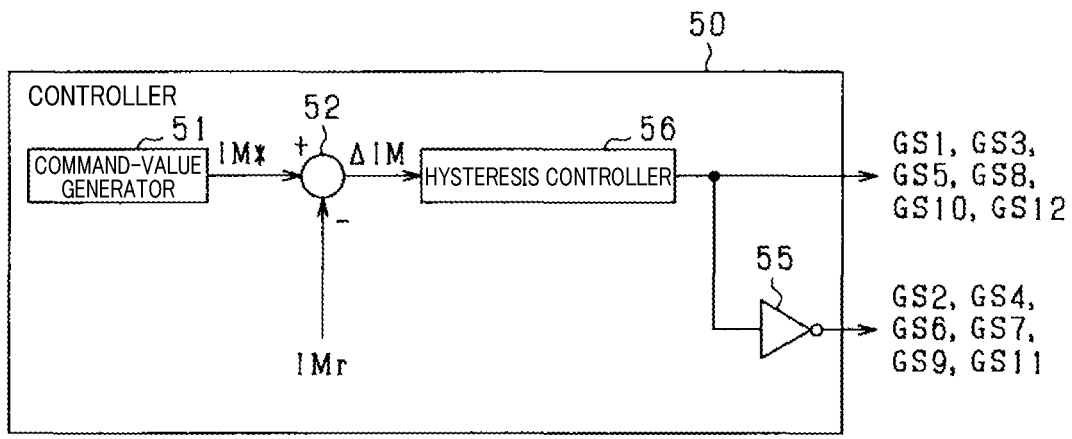
FIG. 8 is a functional block diagram of a controller according to a modification of the first embodiment.

FIG. 8 is a functional block diagram of a controller 50 according to a modification of the first embodiment.

As shown in FIG. 8, the controller 50 according to this modification includes a hysteresis controller 56 instead of the PI controller 53 and the PWM generator 54 included in the controller 50 according to the first embodiment (see FIG. 3).

In this modification, the controller 50 generates the operation signals by hysteresis control. Specifically, the current deviation $\Delta IM$ calculated by the current deviation calculator 52 is inputted to the hysteresis controller 56. Then, the hysteresis controller 56 generates the first operation signal based on the current deviation $\Delta IM$. Further, the phase inverter 55 generates the second operation signal by inverting the logic of the first operation signal generated by the hysteresis controller 56. Consequently, the winding current IMr is controlled within a range having a width of $\pm \Delta I$ with respect to the command current IM*.

Second Embodiment

Figure 9:
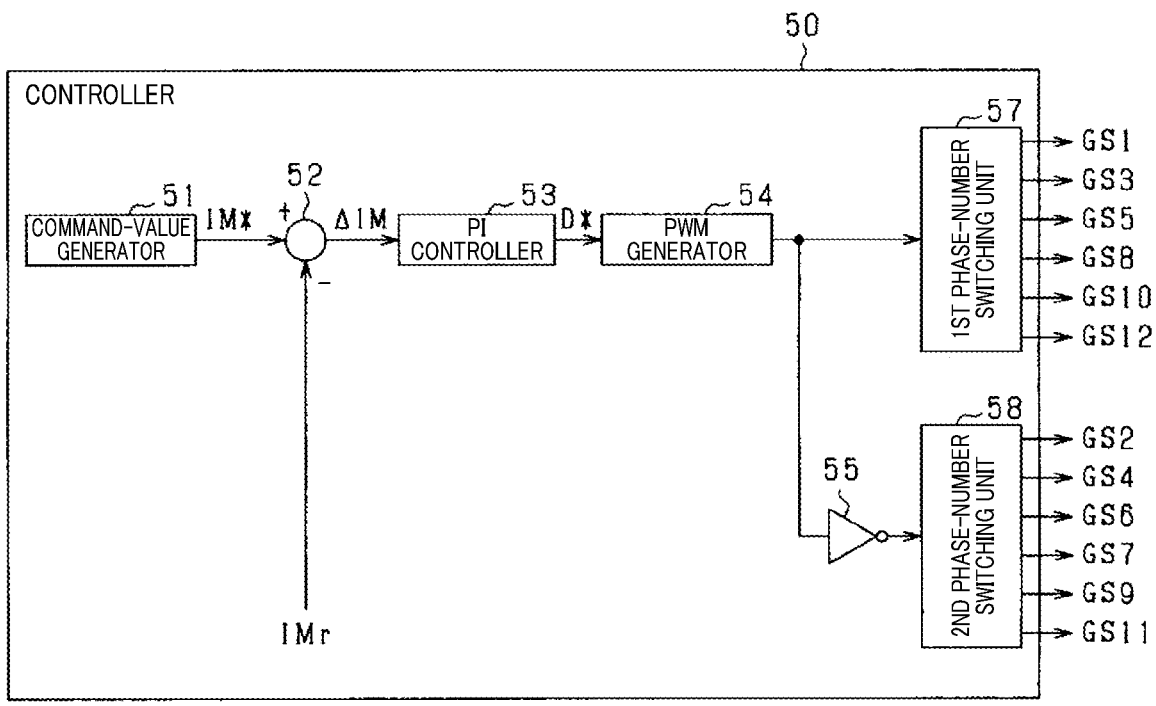
FIG. 9 is a functional block diagram of a controller according to a second embodiment.

FIG. 9 is a functional block diagram of a controller 50 according to the second embodiment.

As shown in FIG. 9, the controller 50 according to the present embodiment further includes a first phase-number switching unit 57 and a second phase-number switching unit 58 compared to the controller 50 according to the first embodiment (see FIG. 3).

In the present embodiment, the controller 50 changes, according to the states of the first and second storage batteries 100 and 110, the number of phases of the U-phase, V-phase and W-phase windings 31, 32 and 33 through which electric current flows during the temperature-raising control (i.e., in the first and second energization processes).

Specifically, in the present embodiment, the first operation signal generated by the PWM generator 54 is inputted to the first phase-number switching unit 57. Then, the first phase-number switching unit 57 switches, according to the amplitude of electric current flowing through the first and second storage batteries 100 and 110, the number of phases of the switches to which the first operation signal is outputted between three and two. More specifically, when the current amplitude Ia (i.e., the amplitude of electric current flowing through the first and second storage batteries 100 and 110) corresponding to the command current IM* is larger than or equal to an amplitude determination value TA, the first phase-number switching unit 57 outputs the first operation signal to all of the first, third, fifth, eighth, tenth and twelfth switches Q1, Q3, Q5, Q8, Q10 and Q12. On the other hand, when the current amplitude Ia corresponding to the command current IM* is smaller than the amplitude determination value TA, the first phase-number switching unit 57 outputs the first operation signal to only the first, third, eighth and tenth switches Q1, Q3, Q8 and Q10.

The amplitude determination value TA may be set to, for example, the maximum current value at which teeth of a stator (not shown) of the rotating electric machine 30, around which the U-phase, V-phase and W-phase windings 31, 32 and 33 are wound, are not magnetically saturated when electric current flows through only two of the three armature windings 31, 32 and 33.

The second operation signal generated by the phase inverter 55 is inputted to the second phase-number switching unit 58. Then, the second phase-number switching unit 58 switches, according to the amplitude of electric current flowing through the first and second storage batteries 100 and 110, the number of phases of the switches to which the second operation signal is outputted between three and two. More specifically, when the current amplitude Ia corresponding to the command current IM* is larger than or equal to the amplitude determination value TA, the second phase-number switching unit 58 outputs the second operation signal to all of the second, fourth, sixth, seventh, ninth and eleventh switches Q2, Q4, Q6, Q7, Q9 and Q11. On the other hand, when the current amplitude Ia corresponding to the command current IM* is smaller than the amplitude determination value TA, the second phase-number switching unit 58 outputs the second operation signal to only the second, fourth, seventh and ninth switches Q2, Q4, Q7 and Q9.

Next, a process of the controller 50 for performing the temperature-raising control according to the present embodiment will be described with reference to FIG. 10. This process is repeatedly executed by the controller 50 in a predetermined cycle.

Compared to the process according to the first embodiment (see FIG. 6), the process according to the present embodiment further includes steps S31-S33 instead of step S16.

Figure 10:
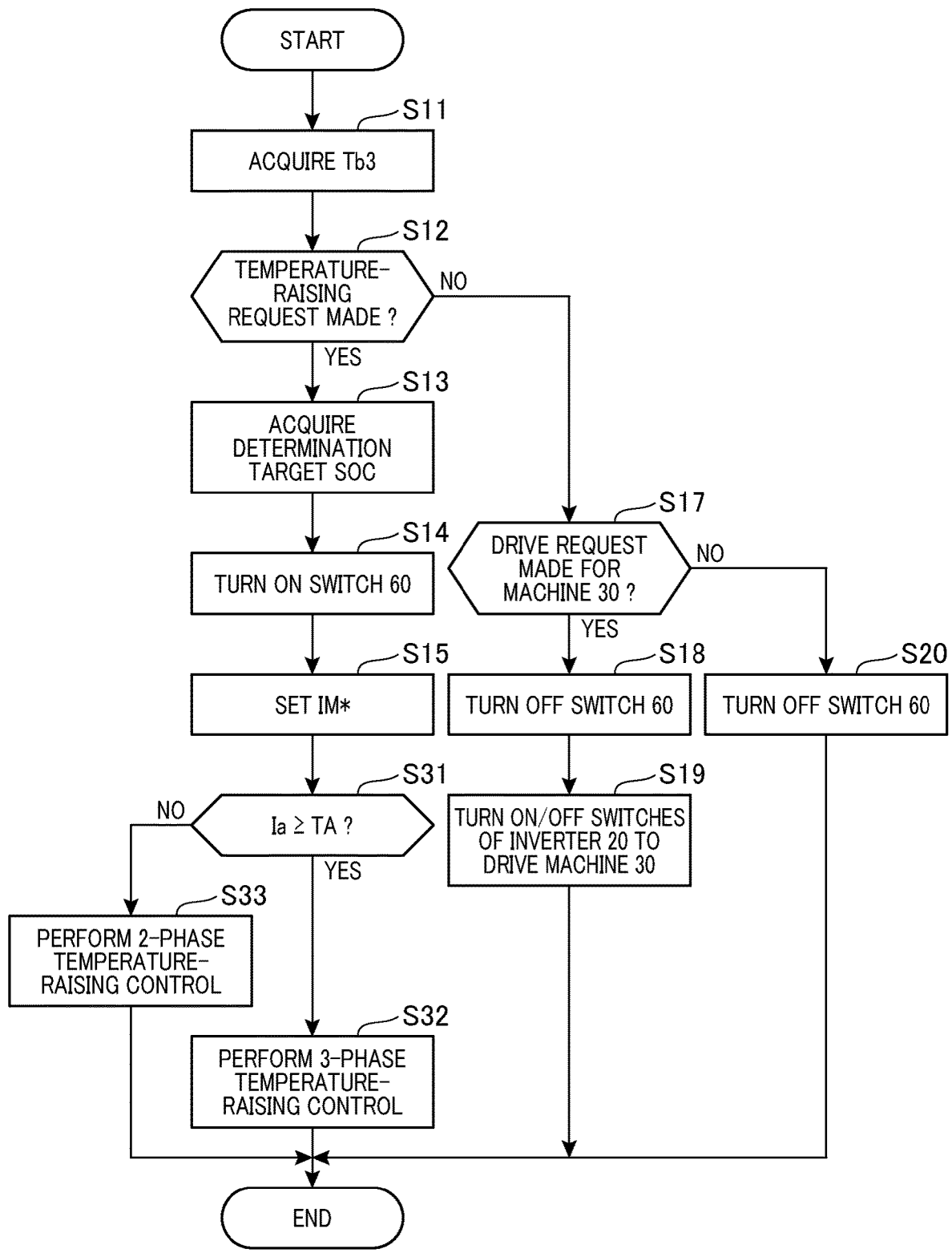
FIG. 10 is a flow chart illustrating a process of the controller according to the second embodiment for performing a temperature-raising control.

Specifically, in the present embodiment, as shown in FIG. 10, upon setting the command current IM* in step S15, the process proceeds to step S31.

In step S31, it is determined whether the current amplitude Ia corresponding to the command current IM* set in step S15 is larger than or equal to the amplitude determination value TA.

If the determination in step S31 results in a "YES" answer, i.e., if the current amplitude Ia is larger than or equal to the amplitude determination value TA, the process proceeds to step S32.

In step S32, the temperature-raising control is performed by operating the switches of the first and second inverters 20 and 40 so as to have electric current flow through all of the U-phase, V-phase and W-phase windings 31, 32 and 33. Thereafter, the process shown in FIG. 10 is terminated.

In contrast, if the determination in step S31 results in a "NO" answer, i.e., if the current amplitude Ia is smaller than the amplitude determination value TA, the process proceeds to step S33.

In step S33, the temperature-raising control is performed by operating the switches of the first and second inverters 20 and 40 so as to have electric current flow through only two of the U-phase, V-phase and W-phase windings 31, 32 and 33. Thereafter, the process shown in FIG. 10 is terminated.

As described above, in the present embodiment, the controller 50 performs the first and second energization processes in such a manner that the number of phases of the armature windings 31-33 of the rotating electric machine 30 through which electric current flows in the first and second energization processes is smaller when the current amplitude Ia is smaller than the amplitude determination value TA than when the current amplitude Ia is larger than or equal to the amplitude determination value TA. Consequently, it becomes possible to suppress variation in the magnetic flux during the temperature-raising control, to reduce the iron loss and noise in the rotating electric machine 30 and thus to suppress the energy loss during the temperature-raising control.

Modification of Second Embodiment

In step S33 of the process shown in FIG. 10, the controller 50 may operate, according to the states of the first and second storage batteries 100 and 110, the switches of the first and second inverters 20 and 40 so as to have electric current flow through only one of the U-phase, V-phase and W-phase windings 31, 32 and 33.

Third Embodiment

Figure 11:
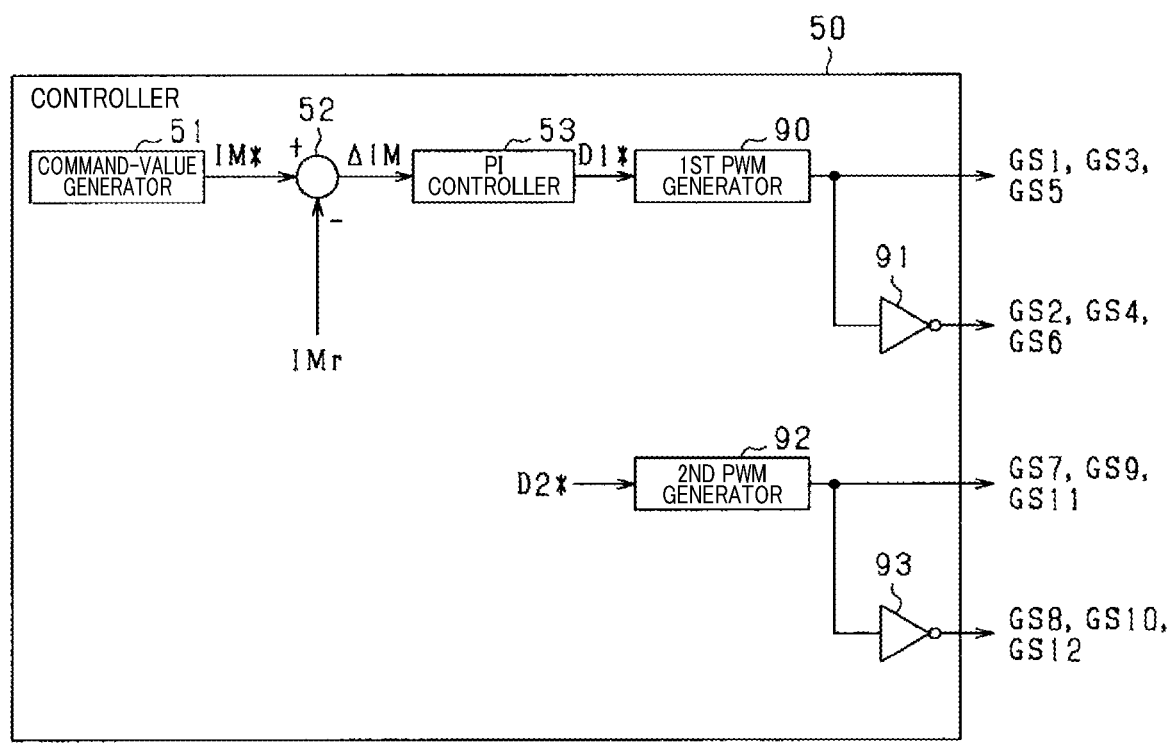
FIG. 11 is a functional block diagram of a controller according to a third embodiment.

FIG. 11 is a functional block diagram of a controller 50 according to the third embodiment.

As shown in FIG. 11, the controller 50 according to the present embodiment includes a first PWM generator 90, a first phase inverter 91, a second PWM generator 92 and a second phase inverter 93 instead of the PWM generator 54 and the phase inverter 55 included in the controller 50 according to the first embodiment (see FIG. 3).

In the present embodiment, the temperature-raising control is performed by the controller 50 with the duty ratios of the seventh to the twelfth switches Q7-Q12 of the second inverter 40 kept at a value higher than 50%.

Specifically, in the present embodiment, a first duty command value D1* calculated by the PI controller 53 is inputted to the first PWM generator 90. Then, the first PWM generator 90 generates a first operation signal based on the first duty command value D1*, and outputs the generated first operation signal to the gates of the first, third and fifth switches Q1, Q3 and Q5.

The first operation signal outputted from the first PWM generator 90 to the gate of the first switch Q1 constitutes a first gate signal GS1. The first operation signal outputted from the first PWM generator 90 to the gate of the third switch Q3 constitutes a third gate signal GS3. The first operation signal outputted from the first PWM generator 90 to the gate of the fifth switch Q5 constitutes a fifth gate signal GS5.

The first operation signal outputted from the first PWM generator 90 is also inputted to the first phase inverter 91. Then, the first phase inverter 91 generates a second operation signal by inverting the logic of the first operation signal, and outputs the generated second operation signal to the gates of the second, fourth and sixth switches Q2, Q4 and Q6.

The second operation signal outputted from the first phase inverter 91 to the gate of the second switch Q2 constitutes a second gate signal GS2. The second operation signal outputted from the first phase inverter 91 to the gate of the fourth switch Q4 constitutes a fourth gate signal GS4. The second operation signal outputted from the first phase inverter 91 to the gate of the sixth switch Q6 constitutes a sixth gate signal GS6.

On the other hand, a second duty command value D2* is inputted to the second PWM generator 92. In the present embodiment, the second duty command value D2* is a command value for fixing the duty ratios of the seventh, ninth and eleventh switches Q7, Q9 and Q11 to 80%. Then, the second PWM generator 92 generates a third operation signal based on the second duty command value D2*, and outputs the generated third operation signal to the gates of the seventh, ninth and eleventh switches Q7, Q9 and Q11.

The third operation signal outputted from the second PWM generator 92 to the gate of the seventh switch Q7 constitutes a seventh gate signal GS7. The third operation signal outputted from the second PWM generator 92 to the gate of the ninth switch Q9 constitutes a ninth gate signal GS9. The third operation signal outputted from the second PWM generator 92 to the gate of the eleventh switch Q11 constitutes an eleventh gate signal GS11.

The third operation signal outputted from the second PWM generator 92 is also inputted to the second phase inverter 93. Then, the second phase inverter 93 generates a fourth operation signal by inverting the logic of the third operation signal, and outputs the generated fourth signal to the gates of the eighth, tenth and twelfth switches Q8, Q10 and Q12.

The fourth operation signal outputted from the second phase inverter 93 to the gate of the eighth switch Q8 constitutes an eighth gate signal GS8. The fourth operation signal outputted from the second phase inverter 93 to the gate of the tenth switch Q10 constitutes a tenth gate signal GS10. The fourth operation signal outputted from the second phase inverter 93 to the gate of the twelfth switch Q12 constitutes a twelfth gate signal GS12.

Figure 12:
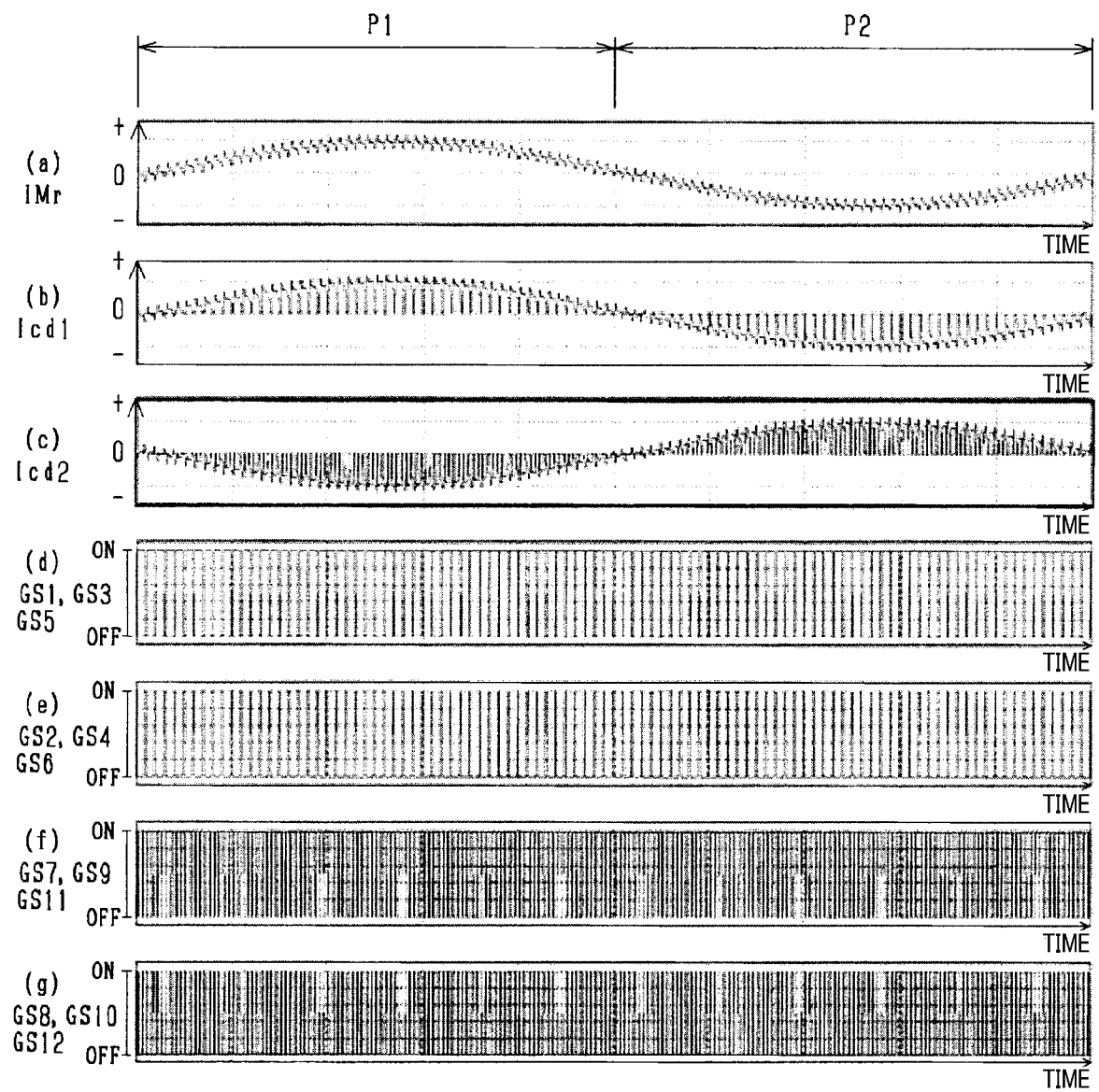
FIG. 12 is a timing chart illustrating operation of an electric power conversion apparatus according to the third embodiment.

FIG. 12 is a timing chart illustrating operation of the electric power conversion apparatus 10 according to the present embodiment. Specifically, FIG. 12(a) illustrates the change with time of the winding current IMr. FIG. 12(b) illustrates the change with time of electric current Icd1 flowing through the first storage battery 100. FIG. 12(c) illustrates the change with time of electric current Icd2 flowing through the second storage battery 110. FIG. 12(d) illustrates the first, third and fifth gate signals GS1, GS3 and GS5. FIG. 12(e) illustrates the second, fourth and sixth gate signals GS2, GS4 and GS6. FIG. 12(f) illustrates the seventh, ninth and eleventh gate signals GS7, GS9 and GS11. FIG. 12(g) illustrates the eighth, tenth and twelfth gate signals GS8, GS10 and GS12.

In each first period P1, the first duty ratio Duty1 of the first, third and fifth gate signals GS1, GS3 and GS5 changes according to the command current IM*. On the other hand, the second duty ratio Duty2 of the seventh, ninth and eleventh gate signals GS7, GS9 and GS11 is kept constant at 80%. Moreover, in each first period P1, the average value of the winding current IMr changes in the form of a positive half wave according to the combination of the first and second duty ratios Duty1 and Duty2. Consequently, the electric current Icd1 flowing through the first storage battery 100 becomes positive (i.e., discharge current) and the electric current Icd2 flowing through the second storage battery 110 becomes negative (i.e., charge current).

In each second period P2, the first duty ratio Duty1 of the first, third and fifth gate signals GS1, GS3 and GS5 changes according to the command current IM*. On the other hand, the second duty ratio Duty2 of the seventh, ninth and eleventh gate signals GS7, GS9 and GS11 is kept constant at 80%. Moreover, in each second period P2, the average value of the winding current IMr changes in the form of a negative half wave according to the combination of the first and second duty ratios Duty1 and Duty2. Consequently, the electric current Icd2 flowing through the second storage battery 110 becomes positive (i.e., discharge current) and the electric current Icd1 flowing through the first storage battery 100 becomes negative (i.e., charge current).

According to the present embodiment, it is possible to achieve the same advantageous effects as achievable according to the first embodiment.

Fourth Embodiment

An electric power conversion apparatus 11 according to the fourth embodiment has a similar configuration to the electric power conversion apparatus 10 according to the first embodiment. Therefore, the differences therebetween will be mainly described hereinafter.

Figure 13:
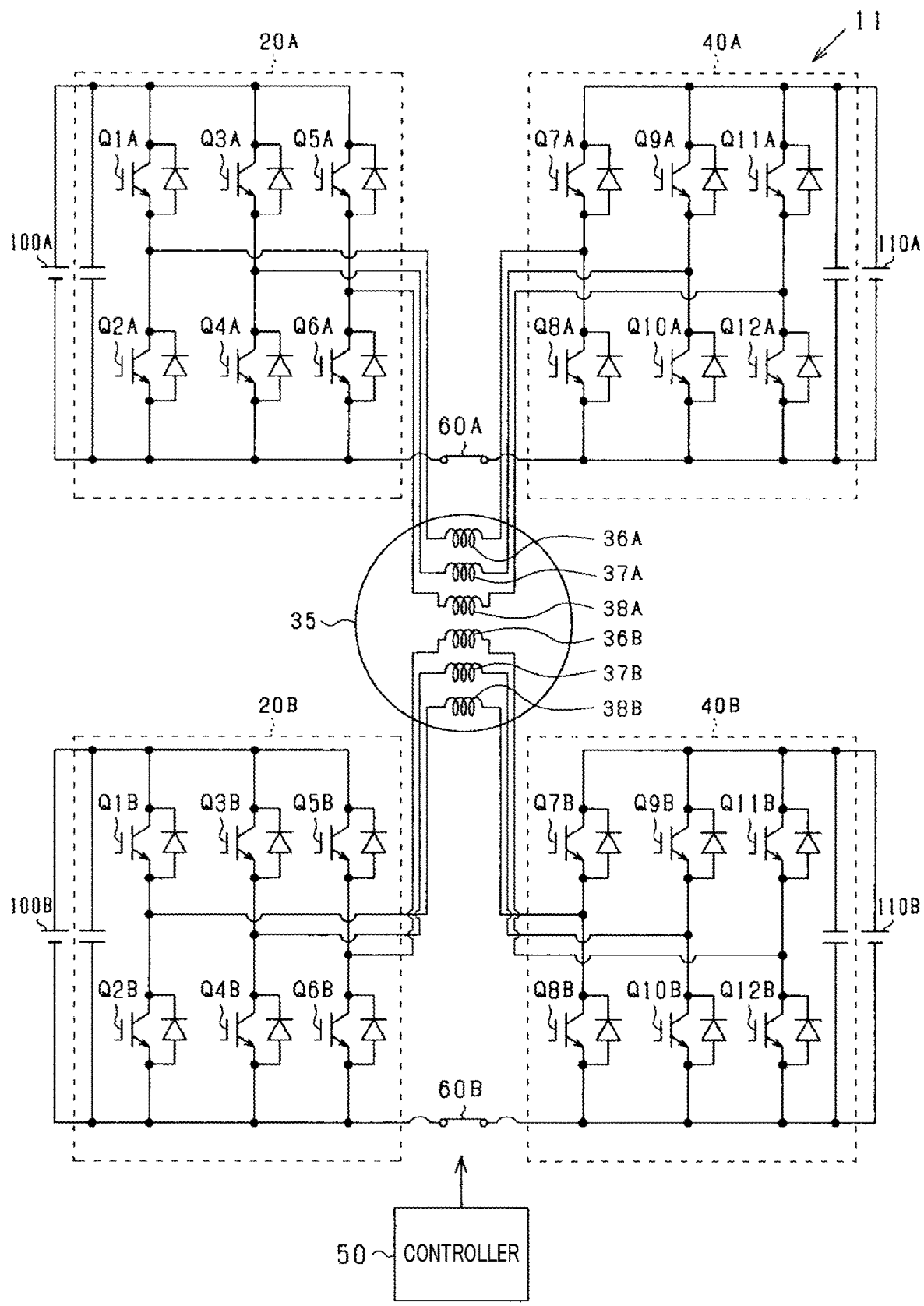
FIG. 13 is an overall configuration diagram of an electric power conversion apparatus according to a fourth embodiment.

As shown in FIG. 13, the electric power conversion apparatus 11 according to the fourth embodiment includes a rotating electric machine 35, a first inverter 20A, a second inverter 40A, a third inverter 20B and a fourth inverter 40B.

The first inverter 20A is connected between a first storage battery 100A and the rotating electric machine 35. The second inverter 40A is connected between a second storage battery 110A and the rotating electric machine 35. The third inverter 20B is connected between a third storage battery 100B and the rotating electric machine 35. The fourth inverter 40B is connected between a fourth storage battery 110B and the rotating electric machine 35.

Both the first and third inverters 20A and 20B have the same configuration as the first inverter 20 described in the first embodiment. Both the second and fourth inverters 40A and 40B have the same configuration as the second inverter 40 described in the first embodiment. Therefore, explanation of the first, second, third and fourth inverters 20A, 40A, 20B and 40B will be omitted hereinafter.

The rotating electric machine 35 is a three-phase double-winding rotating electric machine which has a first winding group and a second winding group. The first winding group consists of a first U-phase winding 36A, a first V-phase winding 37A and a first W-phase winding 38A. On the other hand, the second winding group consists of a second U-phase winding 36B, a second V-phase winding 37B and a second W-phase winding 38B.

The first winding group of the rotating electric machine 35 is electrically connected with the first and second inverters 20A and 40A. Specifically, the first U-phase winding 36A has a first end connected to a junction point between a first switch Q1A and a second switch Q2A in the first inverter 20A and a second end connected to a junction point between a seventh switch Q7A and an eighth switch Q8A in the second inverter 40A. The first V-phase winding 37A has a first end connected to a junction point between a third switch Q3A and a fourth switch Q4A in the first inverter 20A and a second end connected to a junction point between a ninth switch Q9A and a tenth switch Q10A in the second inverter 40A. The first W-phase winding 38A has a first end connected to a junction point between a fifth switch Q5A and a sixth switch Q6A in the first inverter 20A and a second end connected to a junction point between an eleventh switch Q11A and a twelfth switch Q12A in the second inverter 40A.

On the other hand, the second winding group of the rotating electric machine 35 is electrically connected with the third and fourth inverters 20B and 40B. Specifically, the second U-phase winding 36B has a first end connected to a junction point between a first switch Q1B and a second switch Q2B in the third inverter 20B and a second end connected to a junction point between the seventh switch Q7B and the eighth switch Q8B in the fourth inverter 40B. The second V-phase winding 37B has a first end connected to a junction point between a third switch Q3B and a fourth switch Q4B in the third inverter 20B and a second end connected to a junction point between a ninth switch Q9B and a tenth switch Q10B in the fourth inverter 40B. The second W-phase winding 38B has a first end connected to a junction point between a fifth switch Q5B and a sixth switch Q6B in the third inverter 20B and a second end connected to a junction point between an eleventh switch Q11B and a twelfth switch Q12B in the fourth inverter 40B.

In the present embodiment, in making electric current flow through the first winding group of the rotating electric machine 35 by the temperature-raising control, the controller 50 first turns on a first changeover switch 60A and then turns on/off the switches of the first and second inverters 20A and 40A, thereby causing charge/discharge current to flow through the first and second storage batteries 100A and 110A. On the other hand, in making electric current flow through the second winding group of the rotating electric machine 35 by the temperature-raising control, the controller 50 first turns on a second changeover switch 60B and then turns on/off the switches of the third and fourth inverters 20B and 40B, thereby causing charge/discharge current to flow through the third and fourth storage batteries 100B and 110B.

According to the present embodiment, it is also possible to achieve the same advantageous effects as achievable according to the first embodiment.

Fifth Embodiment

An electric power conversion apparatus 10 according to the fifth embodiment has a similar configuration to the electric power conversion apparatus 10 according to the first embodiment. Therefore, the differences therebetween will be mainly described hereinafter.

As shown in FIG. 14, the electric power conversion apparatus 10 according to the fifth embodiment includes a changeover switch 61 instead of the changeover switch 60 included in the electric power conversion apparatus 10 according to the first embodiment (see FIG. 1).

Specifically, in the present embodiment, the first positive bus 23 of the first inverter 20 and the second positive bus 43 of the second inverter 40 are connected by the changeover switch 61. The first positive bus 23 and the second positive bus 43 are electrically connected with each other upon the changeover switch 61 being turned on and electrically disconnected from each other upon the changeover switch 61 being turned off.

Moreover, a controller 50 according to the present embodiment has a configuration similar to that of the controller 50 according to the third embodiment (see FIG. 11). Therefore, the function of the controller 50 according to the present embodiment will be described hereinafter with reference to FIG. 11.

In the present embodiment, the first operation signal outputted from the first PWM generator 90 is inputted to the gates of the second, fourth and sixth switches Q2, Q4 and Q6. Moreover, the second operation signal outputted from the first phase inverter 91 is inputted to the gates of the first, third and fifth switches Q1, Q3 and Q5. Consequently, the controller 50 turns on/off the second, fourth and sixth switches Q2, Q4 and Q6 at a third duty ratio Duty3 and the first, third and fifth switches Q1, Q3 and Q5 at a fourth duty ratio Duty4. Here, Duty4=1−Duty3.

On the other hand, the third operation signal outputted from the second PWM generator 92 is inputted to the gates of the eighth, tenth and twelfth switches Q8, Q10 and Q12. Moreover, the fourth operation signal outputted from the second phase inverter 93 is inputted to the gates of the seventh, ninth and eleventh switches Q7, Q9 and Q11. Consequently, the controller 50 turns on/off the eighth, tenth and twelfth switches Q8, Q10 and Q12 at a fifth duty ratio Duty5 and the seventh, ninth and eleventh switches Q7, Q9 and Q11 at a sixth duty ratio Duty6. Here, Duty6=1−Duty5.

According to the present embodiment, it is also possible to achieve the same advantageous effects as achievable according to the first embodiment.

Other Embodiments

The setting of the command current IM* is not limited to the method shown in FIG. 4. For example, the command current IM* may alternatively be set so that in one period Tc of the command current IM*, the positive command current IM* and the negative command current IM* are point-symmetrical with respect to a zero-crossing timing of the command current IM* and each in the form of a trapezoidal wave or a rectangular wave.

Moreover, the command current IM* may alternatively be set so that in one period Tc of the command current IM*, the positive command current IM* and the negative command current IM* are not point-symmetrical with respect to any zero-crossing timing of the command current IM*. For example, the command current IM* may be set so that: in one period Tc of the command current IM*, the first period P1 from a first zero-uperossing timing to a zero-downcrossing timing of the command current IM* and the second period P2 from the zero-downcrossing timing to a second zero-uperossing timing of the command current IM* have different lengths; and the area S1 of the first region and the area S2 of the second region are equal to each other. In this case, it is still possible to have the charge/discharge current of the first storage battery 100 and the charge/discharge current of the second storage battery 110 in one period Tc of the command current IM* balanced with each other.

The changeover switch 60 (or 61) is not limited to a relay. For example, the changeover switch 60 (or 61) may alternatively be implemented by a pair of N-channel MOSFETs having their sources connected with each other or by an IGBT.

The controllers and the control methods described in the present disclosure may be realized by a dedicated computer that includes a processor, which is programmed to perform one or more functions embodied by a computer program, and a memory having the computer program stored therein. As an alternative, the controllers and the control methods described in the present disclosure may be realized by a dedicated computer that includes a processor configured with one or more dedicated hardware logic circuits. As another alternative, the controllers and the control methods described in the present disclosure may be realized by one or more dedicated computers constituted of a combination of a processor programmed to perform one or more functions, a memory and a processor configured with one or more hardware logic circuits. Moreover, the computer program may be stored, as instructions executed by the computer, in a computer-readable non-transitory tangible recording medium.

While the present disclosure has been described pursuant to the embodiments, it should be appreciated that the present disclosure is not limited to the embodiments and the structures. Instead, the present disclosure encompasses various modifications and changes within equivalent ranges. In addition, various combinations and modes are also included in the category and the scope of technical idea of the present disclosure.

What is claimed is:

1. An electric power conversion apparatus comprising:
a rotating electric machine including a plurality of armature windings each having a first end and a second end;
a first inverter including a plurality of switch pairs each consisting of a first upper-arm switch and a first lower-arm switch that are connected in series with each other, the first inverter connecting the first ends of the armature windings with a first storage battery;
a second inverter including a plurality of switch pairs each consisting of a second upper-arm switch and a second lower-arm switch that are connected in series with each other, the second inverter connecting the second ends of the armature windings with a second storage battery;
a first positive bus connected with a positive terminal of the first storage battery;
a second positive bus connected with a positive terminal of the second storage battery;
a first negative bus connected with a negative terminal of the first storage battery;
a second negative bus connected with a negative terminal of the second storage battery;

a changeover switch configured to electrically connect or disconnect between the first positive bus and the second positive bus or between the first negative bus and the second negative bus; and an operating unit configured to operate the changeover switch, the first upper-arm and first lower-arm switches of the first inverter and the second upper-arm and second lower-arm switches of the second inverter, wherein each of the armature windings has the first end thereof connected to a junction point between the first upper-arm and first lower-arm switches of a corresponding one of the switch pairs of the first inverter and the second end thereof connected to a junction point between the second upper-arm and second lower-arm switches of a corresponding one of the switch pairs of the second inverter, the operating unit is further configured to perform, with the changeover switch being in an ON state, a first energization process and a second energization process alternately by operating the first upper-arm and first lower-arm switches of the first inverter and the second upper-arm and second lower-arm switches of the second inverter, in the first energization process, electric current is supplied from the first storage battery to the second storage battery via the first inverter, at least one of the armature windings and the second inverter, and in the second energization process, electric current is supplied from the second storage battery to the first storage battery via the second inverter, at least one of the armature windings and the first inverter.

2. The electric power conversion apparatus as set forth in claim 1, further comprising a residual capacity calculator configured to calculate a battery residual capacity that represents at least one of residual capacities of the first and second storage batteries, wherein the operating unit is configured to perform the first and second energization processes such that the lower the battery residual capacity calculated by the residual capacity calculator, the smaller an amplitude of electric current flowing through the first and second storage batteries and the shorter a switching period of the first and second energization processes.

3. The electric power conversion apparatus as set forth in claim 2, wherein the plurality of armature windings of the rotating electric machine respectively belong to a plurality of phases, and the operating unit is configured to perform the first and second energization processes such that the number of phases of the armature windings through which the electric current flows in the first and second energization processes is smaller when the amplitude of the electric current is smaller than a predetermined value than when the amplitude of the electric current is larger than or equal to the predetermined value.

4. The electric power conversion apparatus as set forth in claim 1, further comprising a temperature detector configured to detect a battery temperature that represents at least one of temperatures of the first and second storage batteries, wherein the operating unit is configured to perform the first and second energization processes such that the lower the battery temperature detected by the temperature detector, the smaller an amplitude of electric current flowing through the first and second storage batteries and the shorter a switching period of the first and second energization processes.

5. The electric power conversion apparatus as set forth in claim 4, wherein the plurality of armature windings of the rotating electric machine respectively belong to a plurality of phases, and the operating unit is configured to perform the first and second energization processes such that the number of phases of the armature windings through which the electric current flows in the first and second energization processes is smaller when the amplitude of the electric current is smaller than a predetermined value than when the amplitude of the electric current is larger than or equal to the predetermined value.

6. The electric power conversion apparatus as set forth in claim 1, wherein in performing the first and second energization processes, the operating unit operates the first upper-arm and first lower-arm switches of the first inverter and the second upper-arm and second lower-arm switches of the second inverter such that the first upper-arm switches of the first inverter are synchronized with the second lower-arm switches of the second inverter and the first lower-arm switches of the first inverter are synchronized with the second upper-arm switches of the second inverter.

* * * * *